United States Patent
McCrady (10) Patent No.: US 9,130,414 B2
(45) Date of Patent: Sep. 8, 2015

(54) ECOCHARGE SYSTEM WITH LAYERED GRAPHENE SHEETS FOR GENERATING EMF FROM THE EARTH'S MAGNETIC FIELD TO POWER ELECTRIC VEHICLES

(71) Applicant: Dennis Drake McCrady, Albuquerque, NM (US)

(72) Inventor: Dennis Drake McCrady, Albuquerque, NM (US)

(*) Notice: Subject to any disclaimer, the term of this patent is extended or adjusted under 35 U.S.C. 154(b) by 429 days.

(21) Appl. No.: 13/847,445

(22) Filed: Mar. 19, 2013

(65) Prior Publication Data
US 2014/0285047 A1    Sep. 25, 2014

(51) Int. Cl.
| | |
|---|---|
| *H02K 3/00* | (2006.01) |
| *H02K 3/04* | (2006.01) |
| *B60L 8/00* | (2006.01) |
| *H02K 23/26* | (2006.01) |
| *H02K 53/00* | (2006.01) |
| *H02K 7/00* | (2006.01) |
| *H02K 7/18* | (2006.01) |
| *B60L 11/00* | (2006.01) |

(52) U.S. Cl.
CPC ... *H02K 3/04* (2013.01); *B60L 8/00* (2013.01); *B60L 11/002* (2013.01); *H02K 7/006* (2013.01); *H02K 7/1815* (2013.01); *H02K 7/1846* (2013.01); *H02K 23/26* (2013.01); *H02K 53/00* (2013.01); *Y02T 10/641* (2013.01); *Y02T 10/7083* (2013.01)

(58) Field of Classification Search
None
See application file for complete search history.

(56) References Cited

U.S. PATENT DOCUMENTS 4,153,757 A * 5/1979 Clark, III .................. 429/47

* cited by examiner

*Primary Examiner* — Tran Nguyen (57) ABSTRACT

The earth's magnetic field has not been mined as a source of energy for electric vehicles. With average field strength of $0.5 \times 10^{-4}$ Tesla around the world it is easy to understand why it has been overlooked. A disruptive technology is needed to mine the earth's magnetic field for powering electric vehicles. Such a technology, graphene, is now at an early stage of development with excellent properties in the form of high conductivity, low resistivity sheets that are durable, light weight, and low cost. Electrical properties of multiple sheets of graphene provide a significant multiplier to earth's weak magnetic field yielding a feasible source of ecologically clean power for electric vehicles. Graphene based EcoCharge systems can be mounted on a vehicles drive shaft and axles putting graphene in motion to mine the earth's magnetic field. Estimates show that EcoCharge can generate 15.1 kW at 60 mph while weighing only 10 oz.

3 Claims, 12 Drawing Sheets

ECOCHARGE SYSTEM WITH LAYERED GRAPHENE SHEETS FOR GENERATING EMF FROM THE EARTH'S MAGNETIC FIELD TO POWER ELECTRIC VEHICLES

CROSS REFERENCE TO RELATED APPLICATIONS (IF ANY)

None.

STATEMENT OF FEDERALLY SPONSORED RESEARCH/DEVELOPMENT (IF ANY)

None.

NAME OF THE PARTIES TO A JOINT RESEARCH AGREEMENT IF THE CLAIMED INVENTION WAS MADE AS A RESULT OF ACTIVITIES WITHIN THE SCOPE OF A JOINT RESEARCH AGREEMENT

None.

REFERENCE TO A "SEQUENCE LISTING," A TABLE, OR A COMPUTER PROGRAM LISTING APPENDIX SUBMITTED ON A COMPACT DISC AND INCORPORATION BY REFERENCE OF THE MATERIAL ON THE COMPACT DISC. THE TOTAL NUMBER OF COMPACT DISCS INCLUDING DUPLICATES AND THE FILES ON EACH COMPACT DISC SHALL BE SPECIFIED

None.

BACKGROUND OF THE INVENTION

Nature provides many resources that can be used to reduce dependence on coal, oil and gas for powering our homes, offices, factories, and modes of transportation. Solar and wind power have been the most used natural resources to supplement coal, oil, and gas for powering homes, offices, and factories. Prototypes for gathering energy from waves and tides have also been constructed and are being evaluated as a supplement to coal, oil, and gas as well. Solar powered photovoltaic (PV) cells have shown the most promise when it comes to providing power for transportation and seemingly are a good fit with current electric car technology.

Attempts have been made to develop experimental, lightweight, single rider, PV powered autos for various contests. Recently, the Tokai Challenger, from Tokai University in Japan, has been a top performer at the World Solar Challenge.[1] It uses a 1.8 kilowatt (kW) PV array. To utilize this technology for a four passenger car travelling at freeway speeds of 67 miles per hour (mph) requires a total of approximately 9 kW.[1] There is not enough surface area on a typical four passenger car (facing the sun) to provide 9 kW. At best, a PV array could be most efficiently used to charge an onboard battery from a stationary charging station when the car is not in use.

[1] T. Murphy, "Do the Math. A Solar-Powered Car?" https://physics.ucsd.edc/do-the-math/2011/11/a-solar-powered-car/

There is another natural resource that has not been mined as an alternate source of energy: the earth's magnetic field. With average field strength approximately $0.5 \times 10^{-4}$ Tesla (T) around the world, it is easy to see why this resource has been overlooked. If a system to mine the earth's magnetic field is developed to power an electrical car using moving electrical wire for example, even the most efficient aluminum wire requires an impractical length to generate a small amount of power at a usable voltage. As good as the electrical properties of aluminum wire are, they are not sufficient for this application. It is clear that a disruptive technology is needed to mine the earth's magnetic field for powering cars, trucks and other vehicles.

Such a disruptive technology, graphene,[2] is now at an early stage of development. Graphene has excellent electrical properties in the form of high conductivity and low resistivity, is extremely strong and durable, and is relatively inexpensive. It is now being produced in sheets[3] large enough to be used for EcoCharge. In addition, MIT is setting up an industrial scale graphene printing press in its graphene lab.[4] The unique feature of graphene for mining the earth's magnetic field is its ability to conduct electricity in low resistivity, two-dimensional sheets. In effect, graphene is a two-dimensional "wire" that will generate current proportional to its resistivity, area, and orientation and motion with respect to the earth's magnetic field. As will be shown below, these properties provide a significant multiplier to earth's weak magnetic field yielding a feasible source of ecologically clean electric power for many types of electric vehicles.

[2] The Royal Swedish Academy of Sciences, "Scientific Background on the Nobel Prize in Physics 2010," Kungl. Vetenskaps-Akademien, 5 October 2010.
[3] http://www.graphene-info.com/sony-developed-new-r2r-method-make-graphene-produced-100-meter-long-sheet
[4] http://idealab.talkingpointsmemo.com/2011/09/mit-setting-up-industrial-scale-graphene-printing-press.php

BRIEF SUMMARY OF THE INVENTION

Figure 1:
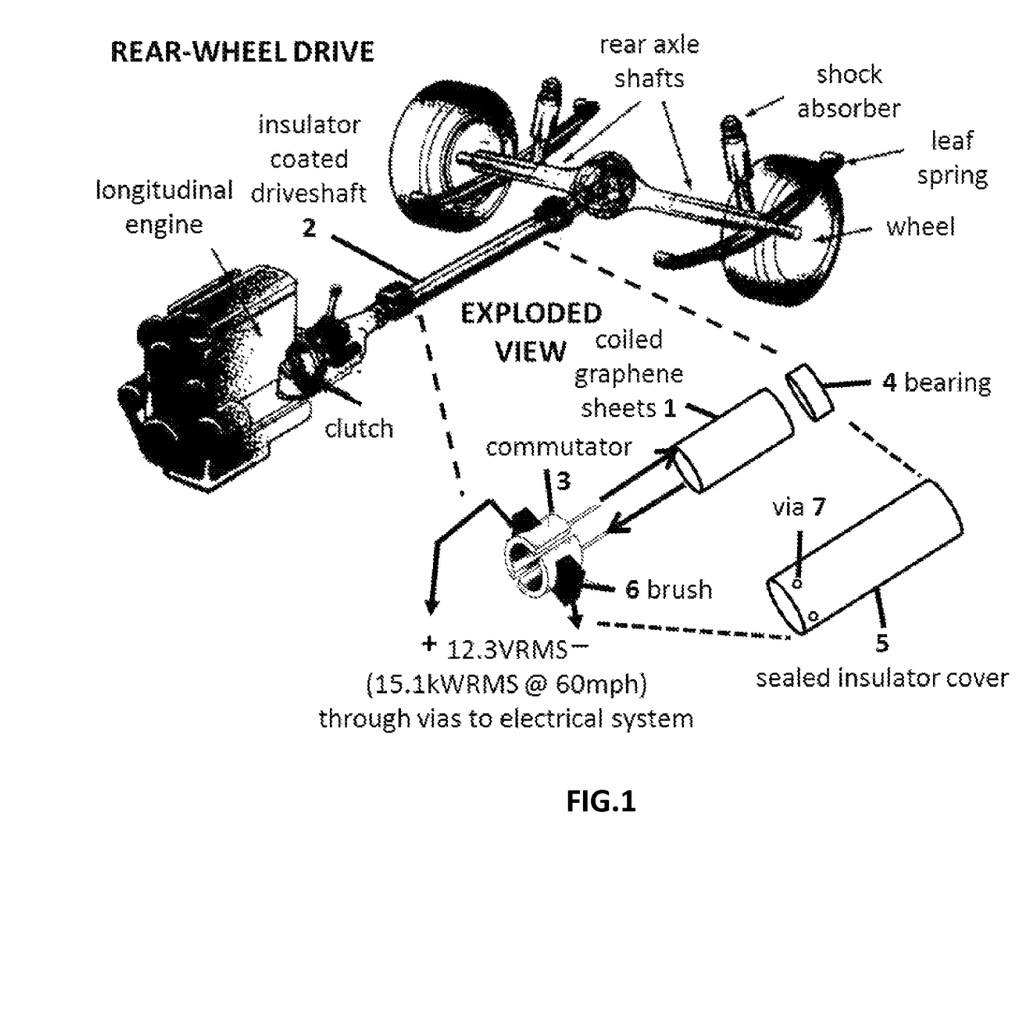
FIG. 1 is a sketch (not to scale) of EcoCharge using an exploded view to show the components of the system, how the components are contained within a sealed insulator cover, and how the system mounts to the drive shaft.

EcoCharge converts earth's magnetic field to electrical current continuously powering an electric vehicle[5]. There is nothing that blocks or shields magnetic fields[6] so EcoCharge systems can be mounted under the vehicle on the driveshaft and/or on the front and rear axles. As shown in FIG. 1, EcoCharge contains graphene sheets 1 wrapped around and attached to the insulated driveshaft 2. The graphene sheets are connected to the commutator 3 input at one end of the system. A bearing 4 is mounted on the drive shaft at the other end of the system and used with the commutator to establish the height above the drive shaft and provide rotation within the sealed insulator cover 5. The sealed insulator cover anchors to the commutator, bearing and vehicle chassis and is sealed to prevent dirt, water and moisture penetration, protecting components mounted to the drive shaft. When the vehicle is moving, the drive shaft rotates along with the graphene sheets converting the earth's magnetic field into electric current as a function of vehicle speed and orientation to the earth's magnetic field. The commutator transfers the electromotive force (emf) from the graphene sheets using its brushes 6 then supplies electrical power through vias 7 in the sealed insulator cover to the electrical system of an electric powered vehicle in order to charge the battery cells while the vehicle is moving. An alternating current (AC) to direct current (DC) converter must be added to the electrical system. Present day AC to DC converters achieve greater than 92% efficiency. It will be shown below that a typical EcoCharge system can generate approximately 15.1 kW Root-Mean-Square (RMS) at 60 mph providing more than enough power for the average four passenger car in Murphy's example.[1] In other words, EcoCharge could conceivably generate all of the power required for a vehicle during long distance trips on high speed interstate highways. The above results are from the specific example assumed for feasibility analysis in the Performance section below.

[5] Vehicle is a general category including automobiles, trucks, SUVs, RVs and any other form of transport.

[6] A. Green, "Shielding Magnetic Fields," The Industrial Physicist, American Institute of Physics, October/November 2001.

EcoCharge systems can also be mounted on both front and rear axles to provide an orthogonal source of electric power mined from the earth's magnetic field. Conversion of magnetic to electrical energy is a maximum when the graphene sheets and the earth's magnetic field are oriented at 0° to one another and zero when their orientation is 90°. If the systems are properly balanced, as the vehicle turns and changes orientation with respect to the earth's magnetic field, electrical power contributions from the orthogonally mounted systems will combine to supply the maximum achievable power. For example, when the drive shaft mounted system is at 0° with respect to the earth's magnetic field the axle mounted systems are at 90°, the drive shaft mounted system contributes a maximum amount of electrical power and the axle mounted system contributes zero. When the drive shaft mounted system is at 90° with respect to the earth's magnetic field the axle mounted systems are at 0°, the axle mounted systems contribute a maximum amount of electrical power and the drive shaft mounted systems contribute zero. When the vehicle is oriented at 45° with respect to the earth's magnetic field, half of the electrical power is contributed by the drive shaft mounted system and half of the electrical power is contributed by the axle mounted systems (if axle and drive shaft mounted systems are balanced).

BRIEF DESCRIPTION OF THE SEVERAL VIEWS OF THE DRAWING (IF ANY)

DETAILED DESCRIPTION OF THE INVENTION

Introduction

EcoCharge utilizes a technology breakthrough in materials, graphene, to mine the earth's magnetic field for an ecologically clean source of electrical energy to continuously power an electric vehicle. Magnetic fields are not shielded by the vehicle frame or chassis allowing EcoCharge to be mounted under the vehicle on the drive shaft or front and/or rear axles. It is estimated that EcoCharge can generate approximately 15.1 kWRMS of electrical power at 12.3 VRMS if the vehicle is travelling at 60 mph at 0° to the earth's magnetic field. This is enough power to sustain the vehicle speed at 60 mph in a package weighing approximately 10 ounces (oz), greatly increasing the range and greatly reducing the energy costs of an electric vehicle. A weight budget will be discussed in the Performance section below. An equivalent system using aluminum wire in place of graphene would only generate 10.4 μWRMS of electrical power in a 3,812 lb package (calculation shown in the Performance section below), a solution not providing reasonable benefit for the unrealistic amount of weight required. Further, EcoCharge systems can be mounted to the front and/or rear axles, orthogonal to the driveshaft mounted system, and their resulting electric power can be summed with the power output of the driveshaft mounted system to power the vehicle at any orientation to the earth's magnetic field.

System Description

To enable a more detailed description of the proposed invention an example system will be used. The purpose here is to show that EcoCharge is feasible while not limiting current and future implementation possibilities. There will be additional architecture choices as EcoCharge is applied to different vehicles and as technology advances in the future.

The example system used in this patent application is based on a rear wheel drive electric vehicle with a backup longitudinal engine as shown in FIG. 1. The electric motor and batteries are not shown in FIG. 1 for simplicity. This vehicle has an EcoCharge useable drive shaft length of 1.493 meters (m), approximately 4.9 feet ('), with a 0.064 m diameter, approximately 2.5 inches ("). For this example, it is assumed that when the vehicle is travelling at 60 mph the drive shaft is rotating at 3,000 revolutions per minute (rpm).

EcoCharge converts earth's magnetic field to electrical current continuously powering the electric vehicle or recharging its battery. As shown in FIG. 1, the example EcoCharge system contains graphene sheets 1 wrapped around and attached to the insulated driveshaft 2. The graphene sheets are connected to the commutator 3 input at one end of the system. A bearing 4 is mounted on the drive shaft at the other end of the system and used with the commutator to establish the height above the drive shaft and provide rotation within the sealed insulator cover 5. The sealed insulator cover anchors to the commutator, bearing and vehicle chassis and is sealed to prevent dirt, water and moisture penetration, protecting components mounted to the drive shaft. When the vehicle is moving, the drive shaft rotates along with the graphene sheets converting the earth's magnetic field into emf as a function of vehicle speed and orientation to the earth's magnetic field. The commutator transfers the emf from the graphene sheets using its brushes 6 then supplies electrical power through vias 7 in the sealed insulator cover to the electrical system of an electric powered vehicle in order to charge the battery cells and power the vehicle while the vehicle is moving.

Figure 2:
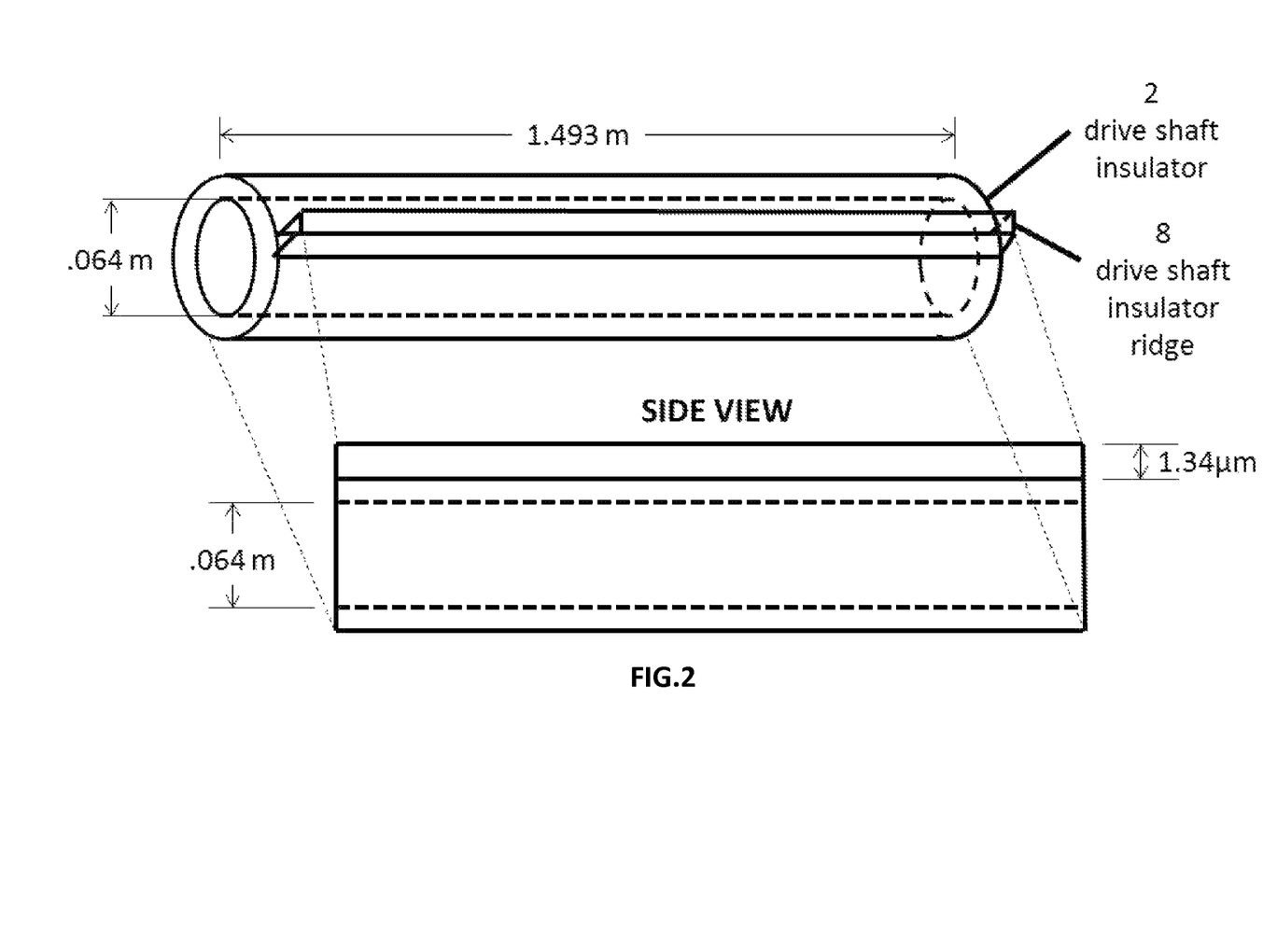
FIG. 2 is a sketch (not to scale) of the insulator that is secured to the drive shaft (or front or rear axles if used) including the insulator ridge to which the 4,059 graphene sheets abut for the specific example analyzed.

FIG. 2 shows a sketch (not to scale) of the drive shaft insulator 2. The drive shaft is insulated from the graphene sheets so the electric current generated by EcoCharge is transferred through the system and not drained through the vehicle chassis. The layered graphene sheets abut each side of the drive shaft insulator ridge 8. This is a convenient breakpoint for defining the (+) and (−) interfaces used for capturing the EcoCharge electrical current generated by emf.

Figure 3:
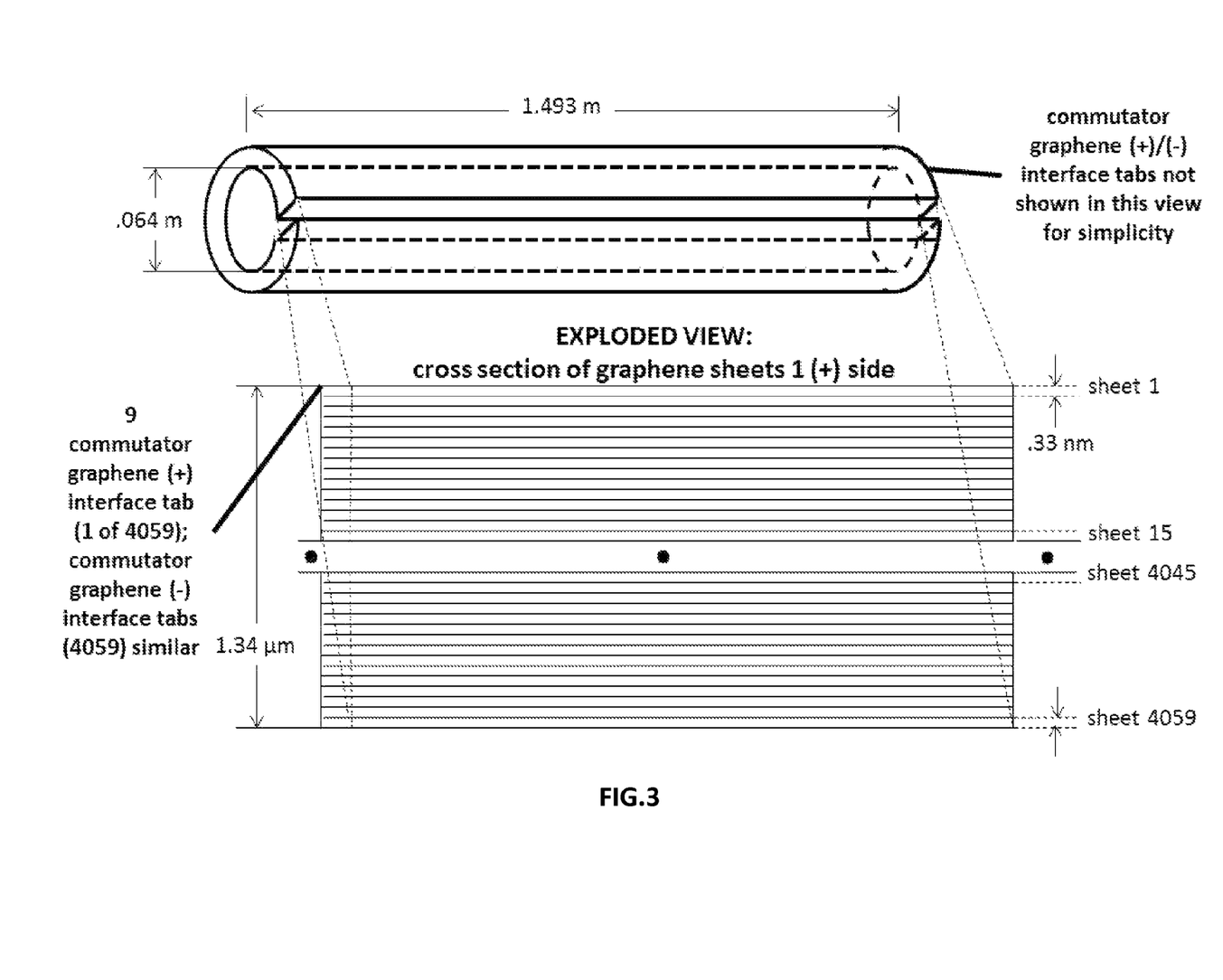
FIG. 3 is a sketch (not to scale) of the 4,059 layered graphene sheets which mount directly to the drive shaft insulator including the 4,059 commutator to graphene (+) interface tabs for the specific example analyzed.
Figure 4:
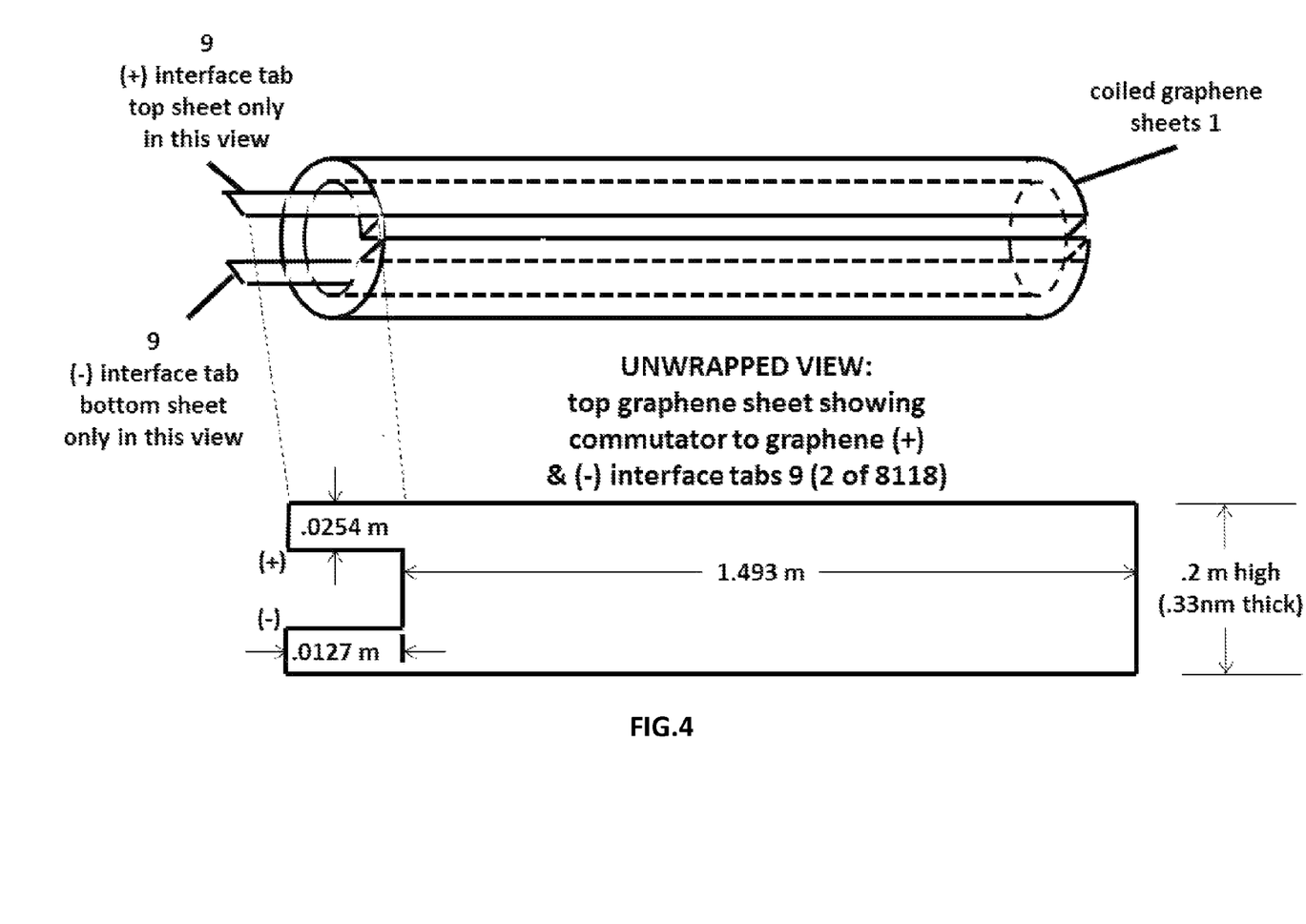
FIG. 4 is a sketch (not to scale) showing more detail of the commutator to graphene (+) and (−) interface tabs that protrude from all 4,059 graphene sheets for the specific example analyzed.

There are 4,059 graphene sheets required for the illustrative example being used. Calculations to determine the number of required sheets, 4,059, are included in the Performance section below. These graphene sheets 1, shown in the sketch in FIG. 3 (not to scale), are mounted directly on and connected to the drive shaft insulator described above. Each sheet has the thickness of a single atom layer of carbon, equal to 0.33 nanometer (nm) while the depth of 4,059 sheets of graphene is 1.34 micrometer (μm) as shown. Commutator graphene (+) interface tabs 9 are shown in the exploded view at the bottom of FIG. 3 but they were excluded from the top 3-dimensional sketch for simplicity. A more detailed sketch of both (+) and (−) interface tabs 9 is shown in FIG. 4. This sketch (not to scale) shows how the interface tabs protrude 0.0127 m (0.5") beyond the top and bottom ends of the same side of the typical graphene sheet that is approximately 0.2 m high by 1.493 m long in order to interface with the commutator. The interface tabs are 0.0254 m (1") wide. There are 4,059 (+) and 4,059 (−) or a total of 8,118 interface tabs for this example.

Figure 5:
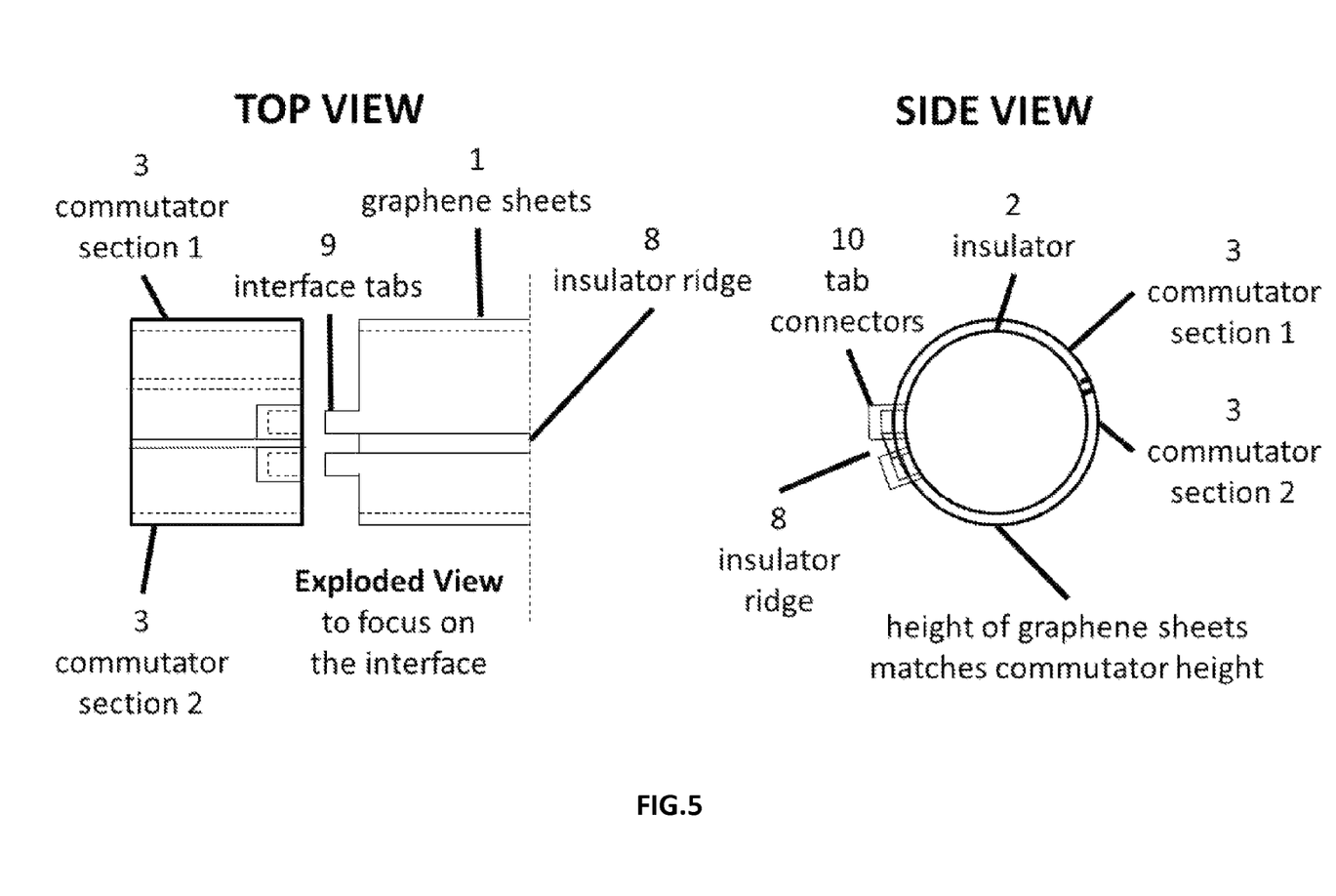
FIG. 5 is a sketch (not to scale) showing an exploded view of the graphene tab to commutator interface highlighting the two section commutator and the tab connectors for the specific example being analyzed.

As their name implies, the interface tabs interface the graphene sheets, where the emf is generated, to the commutator where emf is converted to useful electrical power. As shown in the sketch in FIG. 5 (not to scale), the graphene commutator interface consists of securing the graphene tabs 9 into the tab connectors 10. Note that a two section, copper commutator with negligible resistance is assumed in the illustrative example for simplicity. A commutator resistance calculation in the Performance section below will show that this is a reasonable assumption. In addition, the simple tab connectors 10 shown in FIG. 5 are illustrative of one simple technique. Again, the intent in this patent application is to describe a feasible connection scheme but not limit future implementations. Also, commutators with multiple sections can be used to improve the system emf to electrical load current conversion efficiency by adding more insulator ridges, interface tabs, and tab connectors to line up with multiple sections of the commutator as done in many standard DC motors. The intent of this patent application is to describe the simplest two section commutator implementation but not rule out multiple section commutators in the future.

Figure 6:
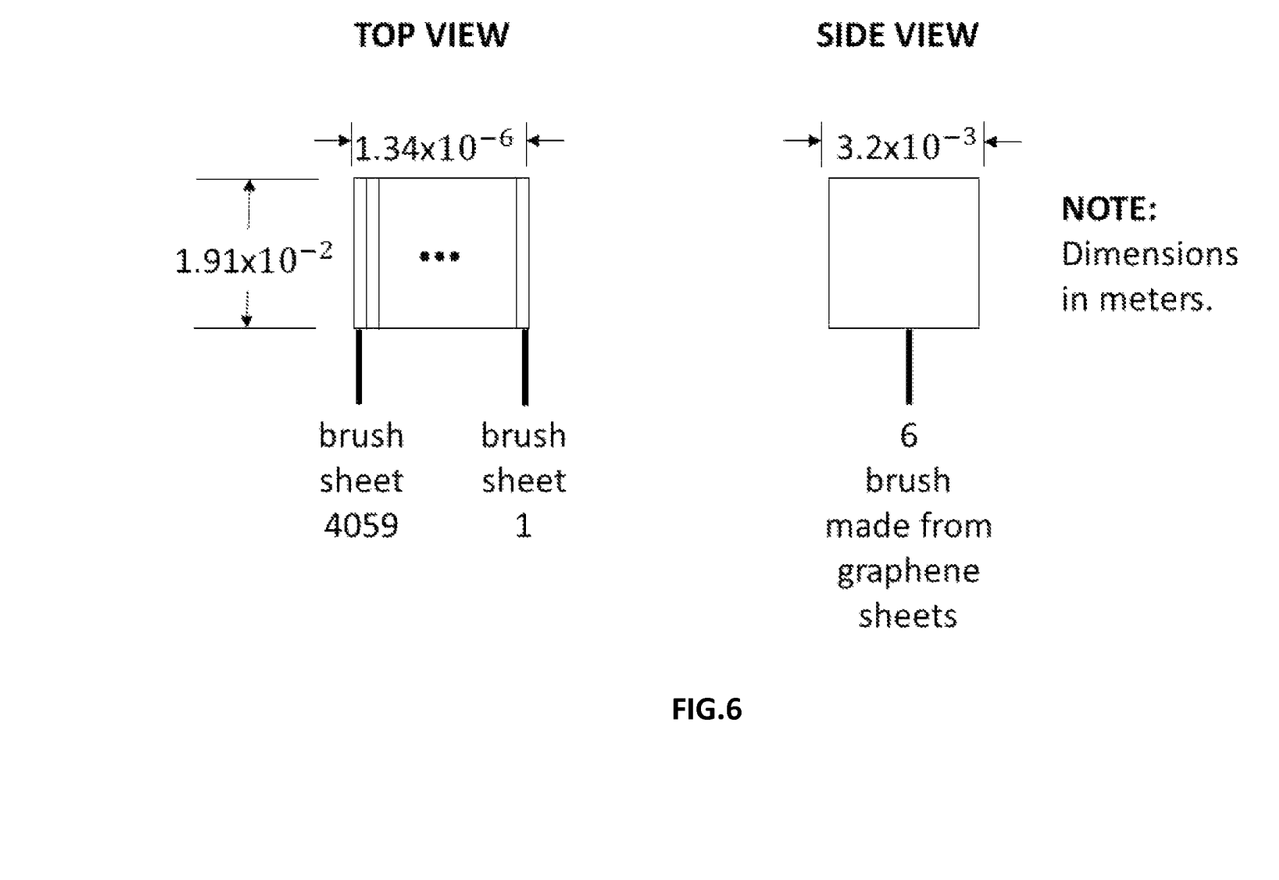
FIG. 6 is a sketch (not to scale) illustrating how the commutator brush is constructed from 4,059 sheets of graphene for the specific example being analyzed.

A commutator brush 6 for this illustrative example is shown in FIG. 6. The brush (one of two needed for this example) is implemented using 4,059 layered graphene sheets. As will be shown in the Performance section below, graphene brushes are required because of graphenes' current handling capability and the amount of current delivered through the brushes for this application. Presently there are no off the shelf commutator brushes available in the size needed for EcoCharge with a high enough current handling capability, graphene is the only choice. Future applications that require higher current flow through the brushes can increase the size of the brushes to improve current handling capability. Current handling capability for the illustrative example is detailed in the Performance section below.

Figure 7:
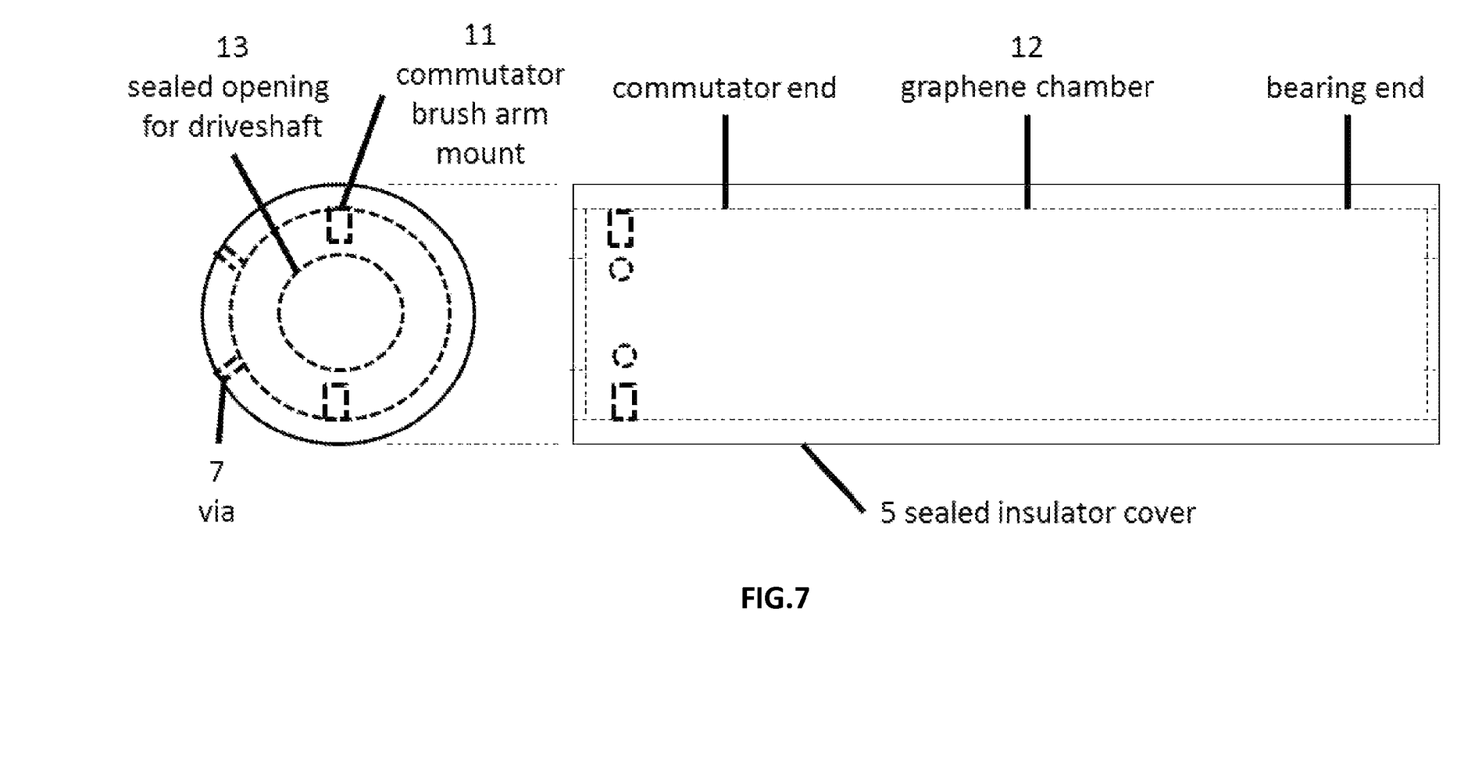
FIG. 7 is a sketch (not to scale) of the sealed insulator cover showing the graphene, commutator, and bearing chamber, the commutator brush arm mounts, and the vias.

To complete the commutator design, brush mounts, brush arms, and brush arm mounts are needed. Like the commutator, all are implemented with high quality copper to ensure negligible resistance and the proper current handling capacity. Brush arms are needed to apply tension to the brush on the commutator for good electrical conduction. As shown in FIG. 7, the brush arm mount 11 is mounted to the sealed insulator cover 5 keeping the tensioned brush stationary while the commutator rotates beneath it. Not shown for simplicity in FIG. 7 but implied are the short lengths of heavy gauge copper wire (negligible resistance with high current handling capacity) running from the commutator brush arm mounts through the via, properly sealed, supplying the EcoCharge generated power to the electric motor electrical system. The brush mounts, brush arms and brush arm mounts are within present manufacturing capability. If current handling capacity becomes a problem, graphene based devices can be developed. Note that the sealed insulator cover 5 shown in FIG. 7 is environmentally sealed to keep moisture and dirt out of the graphene chamber 12 (which encloses the graphene sheets, commutator, and bearing) that would interfere with EcoCharge operation. The graphene sheets were not included in FIG. 7 for simplicity and because they were detailed above. The commutator and bearing were not included in FIG. 7 for simplicity as well and because they are well known devices available off-the-shelf or through special order. Also as shown in FIG. 7, both ends of the sealed insulator cover require sealed openings for the driveshaft 13.

Performance

The purpose of the Performance Section is to show feasibility of the EcoCharge concept by determining pertinent performance parameters using well known methods and equations. In order to provide realistic results, a specific example has been defined for analysis using values of parameters that are available in the open literature and making realistic assumptions when necessary to proceed. The specific example used was described earlier in the System Description Section. Analyzing a specific example is not intended to limit the scope of this patent application but to serve as a realistic test case to verify EcoCharge feasibility. The claims below will be used to define the breadth of this EcoCharge patent application.

As a realistic and illustrative example for analysis assume:
1. The velocity of the vehicle is 60 mph.
2. The vehicle drive shaft rotates at 3,000 revolutions per minute (rpm) when the vehicle velocity is 60 mph.
3. The relationship between drive shaft rpm and vehicle velocity is linear for simplicity.
4. The vehicle drive shaft frequency f=3,000 rpm/60 seconds/minute=50 rps.
5. The angular velocity of the vehicle drive shaft ω=2π50 rps.
6. The diameter of the vehicle drive shaft is d=0.06352 m (2.5").
7. The width of the graphene sheets mounted on the vehicle drive shaft $w_g$=1.493 m (4.9').
8. The area of the graphene sheets exposed to the earth's magnetic field A=π·d·$w_g$=0.3 m$^2$.

9. The assumption is that graphene sheets can be layered to support the EcoCharge application given the current state of semiconductor production technology and continuing Moore's Law advances. While there has not been much work to date on stacking or layering graphene sheets[7,8,9], an application such as EcoCharge hopefully will stimulate interest and advancements in the many graphene centers that have been established at prestigious universities such as MIT mentioned earlier.

[7] L. Zhang, et al, "The Experimental Observation of Quantum Hall Effect of I=3 Chiral Quasiparticles in Trilayer Graphene," Nature Physics 7, 953-957 (2011).
[8] X. Li, et al, "Transfer of Large-Area Graphene Films for High-Performance Transparent Conductive Electrodes," Nano Letters, Vol. 9, No. 12, 4359-4363, 2009.
[9] Graphene Technologies, http://www.graphenetechnologies.com/index.htm 10. The earth's magnetic field strength, B, is estimated at $B=0.5\times10^{-4}$ Tesla (T).
11. $\theta=0°$ initially (cos 0° =1).
12. Assume sufficient layers of graphene to yield a total graphene resistance $R_g=1$ m$\Omega$ for good power transfer through the tabs and commutator brushes defined above.
13. Assume acceptable power transfer through the series combination of two tab and two commutator brush resistances is provided when the tab resistance is $R_t=3.75$ m$\Omega$ and the brush resistance is $R_b=1.25$ m$\Omega$.
14. Assume a reasonable tab length is 0.0127 m (0.5"), a reasonable brush length is 0.0032 m (0.125"), and tabs and brushes are composed 4,059 sheets of graphene for simplicity.
15. For purposes of this patent application, EcoCharge output power will be calculated across the commutator and brush assembly in a no load configuration given the electrical load will vary between specific models of electric vehicles. It is assumed that appropriate electrical matching techniques will be applied to minimize power transfer losses between EcoCharge and the electric vehicle electric system.
16. EcoCharge generated power will be left in terms of WRMS at 12.3 VRMS allowing electric vehicle manufacturers to convert to voltage values needed for their specific models.

Performance—EMF Generated From the Earth's Magnetic Field

The emf, V, generated from the earth's magnetic field is derived from the following equation[10]:

[10] J. D. Kraus and K. R. Carver, *Electromagnetics*, second edition, McGraw-Hill Book Company, New York, N.Y., 1973, p 312, equation (II).

$$V = \oint (v \times B) \, dl, \quad (1)$$

where:
v=velocity,
B=earth's magnetic field, and
l=length.
For EcoCharge, equation (1) expands to:

$$V = \omega B A \sin(\omega t) \cos\theta, \quad (2)$$

where:
$\omega=2\pi f$=angular velocity of drive shaft or front or rear axle,
f=frequency in revolutions per second (rps),
A=area of graphene sheets exposed to the earth's magnetic field=$\pi\times$the diameter of the vehicle's drive shaft (d) times the width of the graphene sheets ($w_g$) on the drive shaft,
$\sin(\omega t)$=harmonic variation of the induced emf due to angular velocity of drive shaft or front or rear axle, and
$\theta$=angle of the graphene sheets to the earth's magnetic field (from dot product).

Substituting the above assumed values for the illustrative example into equation (2) and realizing the commutator delivers the magnitude of the time varying emf:

$$V=|(2\pi 50)(0.5\times10^{-4})(0.3)\sin(\omega t)|\, V \text{ Zero-to-Peak (0-P)} \quad (3)$$

$$|V|=4.71\times10^{-3}\, V\, 0\text{-}P=4.71 \text{ mV 0-}P \text{ of emf per graphene sheet.} \quad (3a)$$

Performance—Resistance of Graphene Sheets, Number of Sheets, and Total EMF

Use assumption 12 and determine the number of graphene sheets, N, required to result in the resistance of the graphene sheets, $R_g=1$ m$\Omega$. The resistance of the graphene sheets, $R_g$, is defined as:

$$R_g = \rho L/A, \quad (4)$$

where:
$R_g=1$ m$\Omega$=per assumption 12 above,
$\rho$=graphene resistivity=$1\times10^{-8}$,
L=length of graphene sheets which is the circumference, C, of the drive shaft,
L=C=$\pi d=\pi(0.06352)=0.2$ m,
A=cross sectional area of graphene sheets supporting emf generated current flow,
A=height (h) of N graphene sheets$\times$width (w)=hw=N$(0.33\times10^{-9})(1.493)$ m$^2$.
Substituting into equation 4 and solving for N:
$R=1\times10^{-3}=1\times10^{-8}(0.2)/[N(0.33\times10^{-9})(1.493)]$, $$N=1\times10^{-8}(0.2)/[(1\times10^{-3})(0.33\times10^{-9})(1.493), \quad (5)$$

$$N=4,059 \text{ sheets.} \quad (5a)$$

To calculate the total emf generated by EcoCharge with 4,059 graphene sheets in V 0-P, combine the results in equations 3a and 5a:

$$emf=(4.71 \text{ mV 0-}P/\text{sheet})(4,059 \text{ sheets})=19.12 \text{ V 0-}P. \quad (6)$$

Converting to VRMS Yields:

$$emf=0.707(19.12 \text{ V 0-}P)=13.52 \text{ VRMS.} \quad (6a)$$

Performance—Resistance and Width of Tabs, Brushes and Commutator

Width of the graphene tabs 9, $w_t$, detailed in FIG. 4 is computed with equation 4 above by substituting appropriate tab values and using assumptions 13 and 14 above.
L=assumed length of graphene tabs=0.0127 m,
A=cross sectional area of graphene tabs assuming 4,059 sheets of graphene, A=height ($h_t$) of 4,059 tabs$\times$width ($w_t$), $A=4,059(0.33\times10^{-9})w_t$, $R_t=3.75\times10^{-3}=1\times10^{-8}(0.0127)/[4,059(0.33\times10^{-9})w_t]$.

Solving for $w_t$ yields:

$$w_t=0.0254 \text{ m (1").} \quad (7)$$

Width of the graphene brushes 6, $w_b$, detailed in FIG. 6 is computed with equation 4 above by substituting appropriate brush values.
L=assumed length of graphene brushes=0.0032 m,
A=cross sectional area of a brush assuming 4,059 sheets of graphene, A=height ($h_t$) of 4,059 graphene sheets$\times$width ($w_b$), $A=4,059(0.33\times10^{-9})(w_t)$, $R_t=1.25\times10^{-3}=1\times10^{-8}(0.0032)/[4,059(0.33\times10^{-9})w_b]$.

Solving for $w_b$ yields:

$$w_b = 0.0191 \text{ m } (0.75") \quad (8)$$

Using assumption 13 above, the (+) tab and (+) brush and (−) tab and (−) brush resistances are in series yielding a total tab-brush resistance, $R_{tb}$, of:

$$R_{tb} = 2R_t + 2R_b = (7.5+2.5) \text{ m}\Omega,$$

$$R_{tb} = 10 \text{ m}\Omega. \quad (9)$$

The resistance of the commutator, $R_c$, is determined assuming:
1. The commutator is constructed of copper with resistance similar to AWG 0000 (i.e. R=0.049Ω/1,000 feet);
2. Commutator length=2" (0.167').

$$R_c = 0.167(0.000049) = 8.2 \text{ }\mu\Omega = \text{negligible}. \quad (10)$$

Performance—Power Generated From the Earth's Magnetic Field

Figure 8:
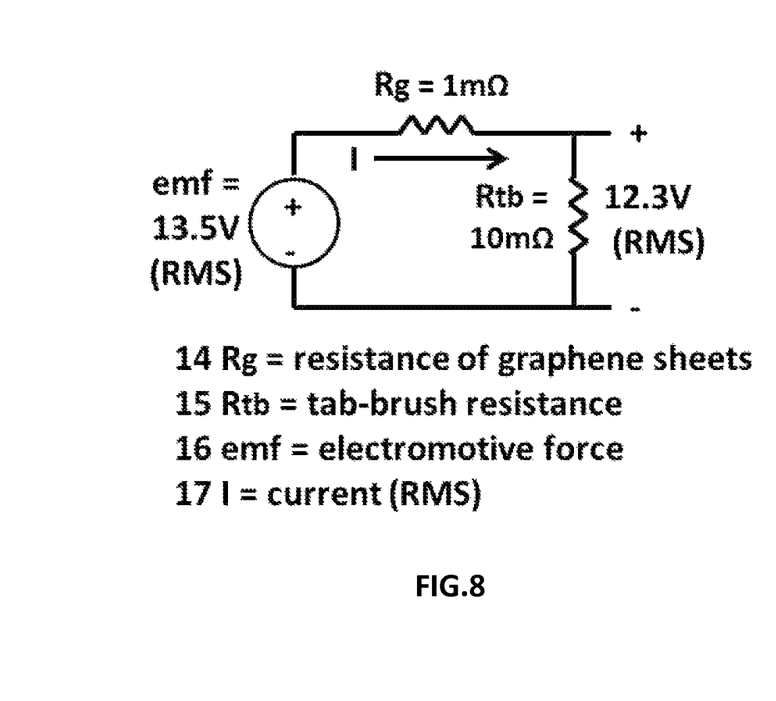
FIG. 8 is the electrical model used to calculate the EcoCharge output power assuming an emf of 13.5 Volts (V) RMS is generated by the graphene sheets, using the calculated resistance of the graphene sheets (Rg) and the series combination of the tab and commutator brush resistance.

Electrical power generated by the graphene sheets is computed using the electrical model of EcoCharge shown in FIG.8 using assumption 14 above, i.e. no load across the commutator. The resistance of the graphene sheets 14 is $R_g=1$ mΩ from assumption 12 above and is in series with the tab-brush resistance 15 $R_{tb}=10$ mΩ from equation 9. This series combination of resistance is driven by the electromotive force 16 produced by the graphene sheets also calculated above, emf=13.5 V. Current 17, I, generated by the emf flows through $R_g$ and $R_{tb}$.

Output power, $P_o$, in WRMS is defined as the current in Amperes (A) RMS times the output voltage $V_o$ in VRMS:

$$P_o = I \times V_o. \quad (11)$$

Using the voltage division rule:

$$V_o = 13.52[R_{tb}/(R_{tb}+R_g)] = 13.52[10 \times 10^{-3}/(10 \times 10^{-3}+1 \times 10^{-3})] = 12.3 \text{ VRMS}. \quad (12)$$

Current is Determined by:

$$I = emf/(R_g+R_{tb}) = 13.5/(10 \times 10^{-3}+1 \times 10^{-3}) = 1{,}229 \text{ ARMS}. \quad (13)$$

Substituting the results of equations 13 and 12 into equation 11 yields the EcoCharge output power in WRMS given assumptions 1-14 above:

$$P_o = 1{,}229 \times 12.3 = 15.1 \text{ kWRMS}. \quad (14)$$

Performance—Current Handling of the Graphene Brushes

Current handling capability of the graphene brushes, $I_{chb}$, is defined as the achievable current density, $I_{cd}$, of graphene $(2 \times 10^9 \text{ A cm}^{-2})^{11}$ times the cross sectional area, $A_{csb}$, of the brushes:

[11] B. Dume, "CVD Graphene Nanoribbons Make Good Interconnects", http://nanotechweb.org/article/tech/50582, Aug. 17, 2012.

$$I_{chb} = I_{cd} \times A_{csb}, \quad (15)$$

where:

$$A_{csb} = h_b \times w_b = 1.34 \times 10^{-5} \text{ cm} \times 0.191 \text{ cm} = 2.559 \times 10^{-6} \text{ cm}^2. \quad (16)$$

Substituting the value for $I_{cd}$ and the result of equation 16 into equation 15 yields:

$$I_{chb} = 2 \times 10^9 \times 2.559 \times 10^{-6} = 5{,}118 \text{ A}. \quad (17)$$

From equation 13 above, EcoCharge current for the assumed example is 1,229 ARMS or 1,737 A 0-P providing margin of a factor of 3. Note that if brush current handling capability becomes a problem for future applications, brush area can be increased to meet the requirement.

Performance—Current Handling of the Graphene Tabs

Current handling capability of the graphene tabs, $I_{cht}$, is defined as the achievable current density, $I_{cd}$, of graphene $(2 \times 10^9 \text{ A cm}^{-2})^{11}$ times the cross sectional area, $A_{cst}$, of the tabs:

$$I_{cht} = I_{cd} \times A_{cst}, \quad (18)$$

where:

$$A_{cst} = h_{txwt} = 1.34 \times 10^{-5} \text{ cm} \times 0.254 \text{ cm} = 3.404 \times 10^{-6} \text{ cm}^2. \quad (19)$$

Substituting the value for $I_{cd}$ and the result of equation 19 into equation 18 yields:

$$I_{cht} = 2 \times 10^{9 \times 3.404 \times 10-6} = 6{,}808 \text{ A}. \quad (20)$$

From equation 13 above, EcoCharge current for the assumed example is 1,229 ARMS or 1,737 A 0-P providing margin of a factor of 5.5. Note that if tab current handling capability becomes a problem for future applications, tab area can be increased to meet the requirement.

Performance—EcoCharge Power: Earth's Magnetic Field Angle Versus MPH

As mentioned above in the Brief Summary of the Invention, EcoCharge systems can be mounted on both front and rear axles, in addition to the drive shaft, to provide an orthogonal source of electric power mined from the earth's magnetic field. Conversion of magnetic to electrical energy is a maximum when the graphene sheets and the earth's magnetic field are oriented at 0° to one another and zero when their orientation is 90°. If the drive shaft and axle mounted systems are properly balanced, as the vehicle turns and changes orientation with respect to the earth's magnetic field, electrical power contributions from the orthogonally mounted systems will combine to supply the maximum achievable power. For example, when the drive shaft mounted system is at 0° with respect to the earth's magnetic field the axle mounted systems are at 90°, the drive shaft mounted system contributes a maximum amount of electrical power and the axle mounted systems contribute zero. When the drive shaft mounted system is at 90° with respect to the earth's magnetic field the axle mounted systems are at 0°, the axle mounted systems contribute a maximum amount of electrical power and the drive shaft mounted systems contribute zero. When the vehicle is oriented at 45° with respect to the earth's magnetic field, half of the electrical power is contributed by the drive shaft mounted system and half of the electrical power is contributed by the axle mounted systems (if axle and drive shaft mounted systems are balanced).

Orthogonal, EcoCharge axle generated power is derived beginning with equation 2 above defining emf, V, repeated for convenience:

$$V = \omega B A \sin(\omega t) \cos \theta,$$

and recognizing that the axle mounted EcoCharge system is mounted at −90° with respect to the drive shaft mounted EcoCharge system. Using the trigonometric identity:

$$\cos(\theta - 90°) = \sin \theta, \quad (21)$$

and substituting into equation 2, axle generated emf can be written as:

$$V = \omega B A \sin(\omega t) \sin \theta. \quad (22)$$

EcoCharge axle generated power follows the same derivation and provides the same power as EcoCharge drive shaft generated power (assuming they are matched) except it varies with the sin θ rather than the cos θ, where θ is the angle to the earth's magnetic field. For example, when θ=90°, the power generated by the axle mounted EcoCharge system is 15.1 kWRMS at 60 mph and the power generated by the drive shaft mounted EcoCharge system is 0 WRMS; when θ=0°, the power generated by the axle mounted system is 0 WRMS and the power generated by the drive shaft mounted system is 15.1 kWRMS at 60 mph. Note that the emf in equation 22 is used to determine total current, I, and output voltage, $V_o$, then $V_o$ and I are multiplied to obtain axle generated power like equations 11 through 14 above for drive shaft generated power.

Figure 9:
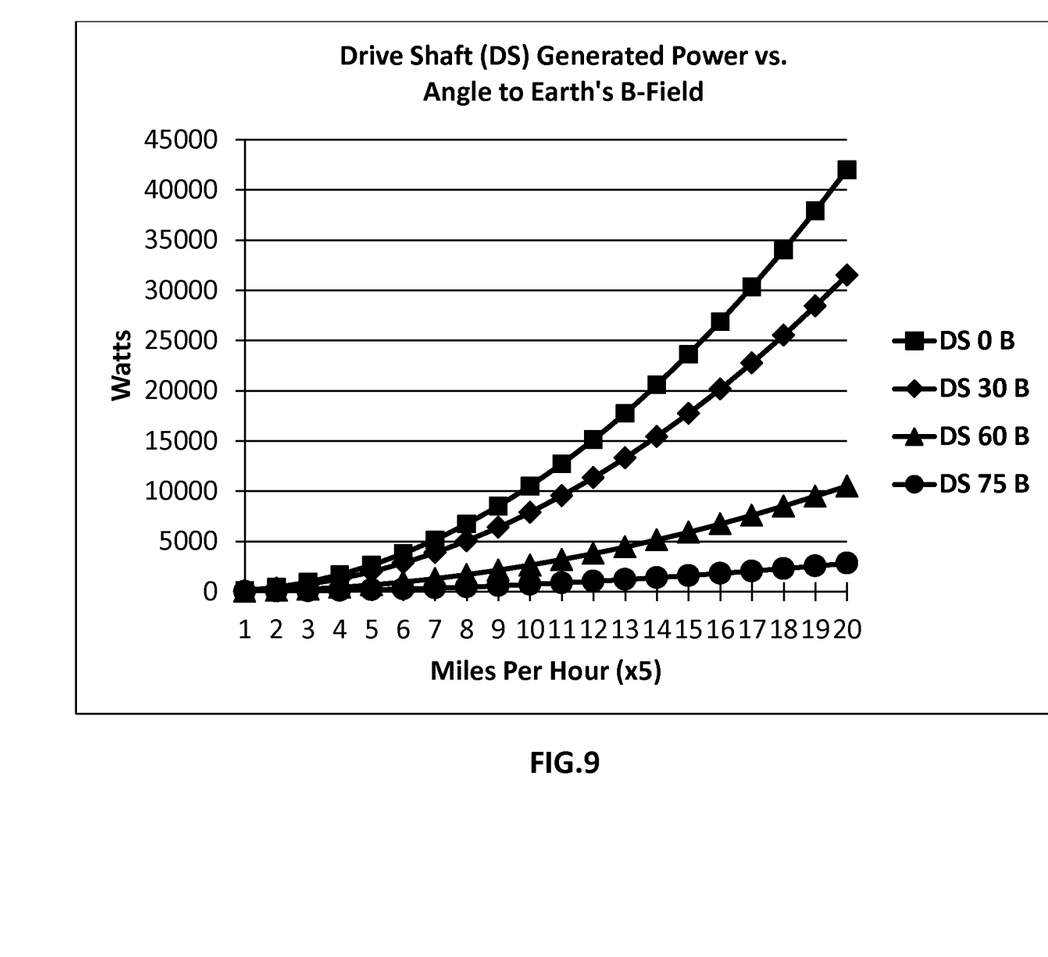
FIG. 9 is a plot of EcoCharge drive shaft generated power versus angle to the earth's magnetic field (0°, 30°, 60°, and 75°) and vehicle speed from 5 to 100 mph in increments of 5 mph.
Figure 10:
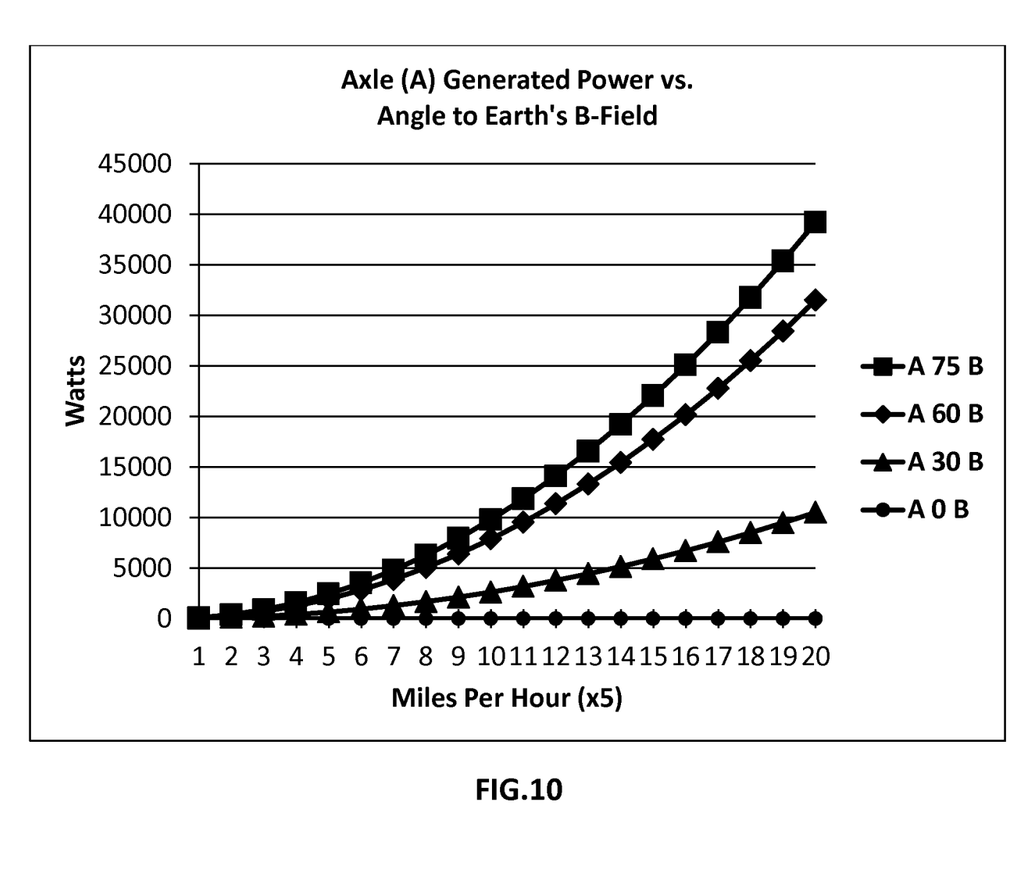
FIG. 10 is a plot of EcoCharge axle generated power versus angle to the earth's magnetic field (0°, 30°, 60°, and 75°) and vehicle speed from 5 to 100 mph in increments of 5 mph.
Figure 11:
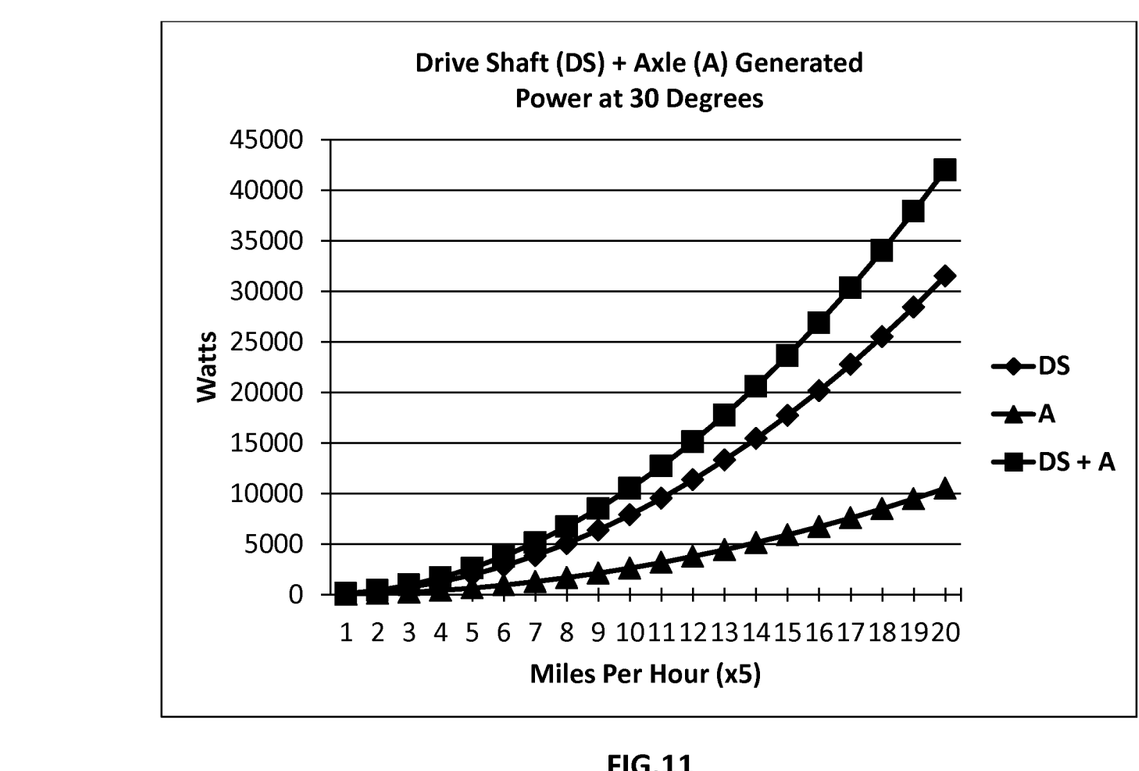
FIG. 11 is a plot of EcoCharge drive shaft, axle, and drive shaft plus axle generated power at 30° to the earth's magnetic field versus speed (from 5 to 100 mph in increments of 5 mph) showing orthogonal power generation at work, i. e. by summing the drive shaft and axle generated power at 30° to the earth's magnetic field, the resulting power is equivalent to drive shaft power at 0° to the earth's magnetic field, the maximum achievable power.

Realistically, the relationship between drive shaft rpm and vehicle velocity changes depending on the transmission gear ratio for the particular electric vehicle being considered. For purposes of this patent application, FIG. 9, FIG. 10, and FIG. 11 were generated with Microsoft Excel using assumption 3 and other results from the Performance section above in order to provide a wider range of expected EcoCharge output power versus vehicle speed and to show the contribution of orthogonality. Similar plots could be generated for any specific electric vehicle given the relationship between drive shaft rpm and vehicle velocity. FIG. 9 shows how EcoCharge drive shaft (DS) generated power increases with increasing vehicle velocity (5 to 100 mph in 5 mph increments) and decreases with increasing angle (0°, 30°, 60°, and 75°) to the earth's magnetic field (B). FIG. 10 shows how EcoCharge orthogonal axle (A) generated power also increases with increasing vehicle velocity (5 to 100 mph in 5 mph increments) but increases with increasing angle (0°, 30°, 60°, and 75°) to the earth's magnetic field (B). FIG. 11 shows drive shaft (DS) generated power, axle (A) generated power, and drive shaft generated power plus axle (DS+A) generated power for the specific case of the vehicle at 30° with respect to the earth's magnetic field. Note that the vehicle angle with respect to the earth's magnetic field is the same as the drive shaft angle. FIG. 11 shows that when the vehicle is at an angle with respect to the earth's magnetic field, EcoCharge generated power can be maximized by combining drive shaft generated power with axle generated power, i.e. the (DS+A) curve at 30° is the same as the DS curve at 0° presuming drive shaft and axle mounted EcoCharge systems are balanced.

Performance—EcoCharge Weight Budget

The weight budget is an estimate of EcoCharge weight from the sum of its components. It is not meant to be the final word on EcoCharge weight, but an estimate, as the weight of each EcoCharge system will depend on its configuration and the vehicle to which it is mounted. As mentioned above, an electric vehicle could have matching EcoCharge systems on the drive shaft and one of the axles. The size of the EcoCharge system will vary with available space on the drive shaft and axles for mounting. Some electric vehicles may only have room for a system that provides 50% or 75% of the achievable power from the above assumed example. The point is, the EcoCharge configuration is flexible and is a small addition of weight to the drive train of the electric vehicle that will not significantly affect dynamics.

The weight of the drive shaft mounted graphene sheets, $wt_g$, will be shown to be negligible for the above assumed example and will not be a significant factor for future EcoCharge systems. For the assumed example, the total area, $A_t$, of 4,059 sheets of graphene is:

$$A_t=(0.2\ m)(1.493\ m)(4,059)=1212\ m^2. \quad (23)$$

The density of graphene[2] is:

$$\rho=0.77\ mg/m^2. \quad (24)$$

Combining equations 23 and 24 and solving yields:

$$wt_g=0.77(1212)=933.24\ mg\ (\rightarrow \div 28.35\ gm/oz)$$

$$wt_g=0.033\ oz\ (\rightarrow \text{negligible}). \quad (25)$$

The weight of the drive shaft mounted graphene sheets, equation 25, is added to the weights of the other EcoCharge components in table 1 below.

TABLE 1

Weight Estimate for EcoCharge Assumed Example

| ECOCHARGE COMPONENT | WEIGHT ESTIMATE (OZ) |
|---|---|
| 4,059 graphene sheets | .033 |
| Commutator | 3 |
| Bearing | 3 |
| Insulated cover | 4 |
| Total | 10.033 |

Performance—EcoCharge with AWG 8 Aluminum Wire, A Comparison

An assumed example with AWG 8 aluminum wire was set up to provide a comparison with the graphene based EcoCharge power generating capability defined above. Aluminum wire is assumed due to its low values of weight and resistance per foot as compared to copper wire. The comparison system further assumes:

1. N turns of AWG 8 aluminum wire is wrapped around a 2.5" diameter drive shaft in order to generate the same 19.12 V 0-P as generated with the graphene sheets above.
2. The vehicle is travelling at 60 mph.
3. The vehicle drive shaft rotates at 3,000 rpm when the vehicle velocity is 60 mph.
4. The vehicle drive shaft frequency f=3,000 rpm/60 seconds/minute=50 rps.
5. The earth's magnetic field strength, B, is estimated at $B=0.5\times10^{-4}$ T.
6. θ=0°, i.e. the drive shaft is at 0° with respect to the earth's magnetic field.
7. Output power will be calculated across the commutator and brush assembly in a no load configuration given the electrical load will vary between specific models of electric vehicles.
8. An off-the-shelf commutator is assumed and the commutator brush resistance is 4 mΩ.

Equation 2 is used to determine the emf generated by the drive shaft wrapped aluminum wire given the above assumptions:

$$V=|wBA\sin(\omega t)|=|2\pi 50(0.5\times 10^{-4})A_w \sin(\omega t)| \quad (26)$$

where $A_w$ is the area of 1 loop of wire around the 2.5" (0.06352 m) diameter drive shaft.

$$A_w=\pi r^2=3.14159(0.03176)^2=0.00317\ m^2. \quad (27)$$

Substituting the result from equation 27 into equation 26 and taking the magnitude:

$$|V|=2\pi 50(0.5\times 10^{-4})(0.00317)=0.05\ mV\ 0\text{-}P. \quad (28)$$

Determine N, the number of loops of AWG 8 aluminum wire to get to 19.12 V 0-P (13.52 VRMS) using the result of equation 28 as follows:

$$N=19.12/.05\times 10^{-3}=382,400\ \text{loops}. \quad (29)$$

The length of wire, L, is the circumference of the drive shaft, $C_{ds}$, times the number of loops from equation 29:

$$L=C_{ds}(382,400)=\pi(0.06352)(382,400)=76,480\ m\rightarrow 250,854'. \quad (30)$$

The weight, $wt_{al}$, and resistance, $R_w$, of the AWG 8 aluminum wire using the result of equation 30 is:

$$wt_{al}=15.2 \text{ lbs}/1{,}000' \times 250.8 = 3812 \text{ lbs}, \quad (31)$$

$$R_w = 1.03 \text{ }\Omega/1{,}000' \times 250.8 = 258.3 \text{ }\Omega. \quad (32)$$

Figure 12:
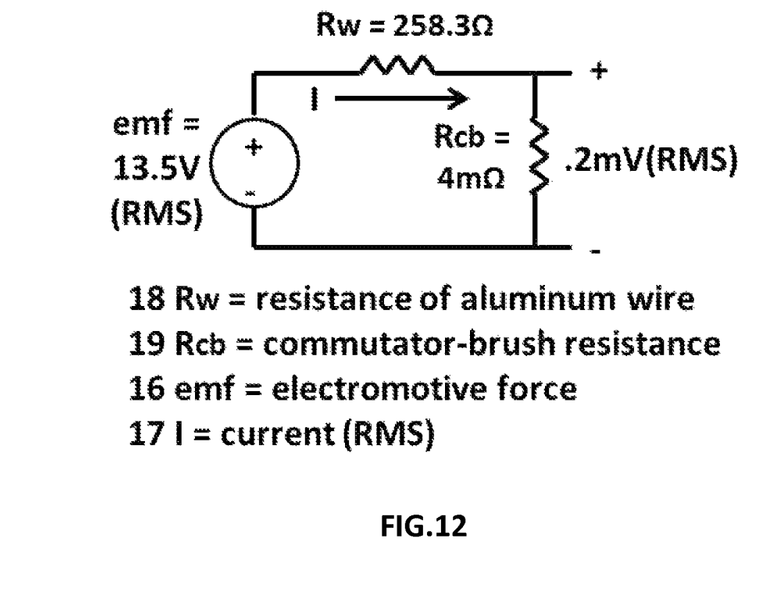
FIG. 12 is the electrical model used to calculate the output power of an equivalent aluminum wire based system used to generate an emf of 13.5 VRMS assuming the resistance of a standard off-the-shelf commutator.

Electrical power generated by the AWG 8 aluminum wire is computed using the electrical model of EcoCharge shown in FIG. 12 using assumption 7 above, i.e. no load across the commutator. The resistance of the aluminum wire 18 calculated above, $R_w=258.3\Omega$, is in series with the commutator-brush resistance 19 assumed above, $R_{cb}=4$ m$\Omega$. This series combination of resistance is driven by the electromotive force 16 produced by the 382,400 loops of AWG 8 aluminum wire also calculated above, emf=13.5 V. Current 17, I, generated by the emf flows through $R_w$ and $R_{cb}$. The commutator brush resistance, $R_{cb} \ll R_w$ meaning $R_{cb}$ is negligible and not used in calculating the current, I:

$$I \approx emf/R_w \approx 13.52/258.3 \approx 0.052 \text{ ARMS}. \quad (33)$$

The output voltage, $V_o$, is:

$$V_o \approx (4 \times 10^{-3}/258.3) 13.52 = 0.2 \text{ mVRMS}. \quad (34)$$

Using the results of equations 33 and 34, the output power, $P_o$, is:

$$P_o = IV_o = 0.052(0.0002) = 10.4 \text{ }\mu\text{WRMS}. \quad (35)$$

To summarize, EcoCharge with AWG 8 aluminum wire that provides an emf of 13.52 VRMS generates 10.4 μWRMS of power at 60 mph at 0° with respect to the earth's magnetic field and weighs 3,812 lbs while the graphene based EcoCharge generates 15.1 kWRMS at 13.52 VRMS and weighs 10 oz. under the same conditions.

What is claimed is:

1. A system generating electromotive force from the earth's magnetic field to power electric vehicles, hereinafter referred to as EcoCharge system, comprising:
   a. An environmentally sealed insulator cover with two environmentally sealed electrical vias, two environmentally sealed end caps around a drive shaft, two commutator brush arm mounts, and a graphene chamber to encapsulate layered graphene sheets, a bearing, and a two section commutator;
   b. An electrical insulator with insulator ridge firmly mounted to the drive shaft of a vehicle within said sealed insulator cover;
   c. 4,059 layered, graphene sheets, 4.9 ft (feet) wide, mounted on said insulator and around the drive shaft with a designated plus (+) side abutting one side of said insulator ridge and a designated minus (−) side abutting the other side of said insulator ridge wherein said plus (+) and minus (−) sides do not make contact;
   d. Plus (+) interface tabs, 1 inch wide, protruding .5 inch from said plus (+) side of said layered graphene sheets;
   e. Minus (−) interface tabs, 1 inch wide, protruding .5 inch from said minus (−) side of said layered graphene sheets;
   f. Said two section commutator mounted to the drive shaft within said insulator cover containing tab connectors for mating with said plus (+) and minus (−) interface tabs, two brushes .75 inch wide made from said 4,059 layered sheets of graphene, and two brush arms attached to said insulator cover on one end and said brushes on the other end applying tension to said brushes on said commutator;
   g. Two AWG 0000 copper wires, one from each said commutator brush arm mount through said vias providing EcoCharge generated power to the vehicle electrical system.

2. The Ecocharge system of 1 wherein:
   a. Said environmentally sealed cover can be varied in size to meet predetermined requirements of said electric vehicle;
   b. The number and width of said layered graphene sheets can be varied to meet predetermined requirements of said electric vehicle;
   c. The length and width of said (+) and (−) interface tabs can be varied to match predetermined requirements of said electric vehicle;
   d. The width and number of layered graphene sheets comprising said two commutator brushes can be varied to match predetermined requirements of said electric vehicle;
   e. Said two section commutator can be replaced with a multiple section commutator with a corresponding number of said tab connectors and said plus (+) and minus (−) interface tabs;
   f. AWG of said two AWG 0000 copper wires, one from each said commutator brush arm mount through said vias providing EcoCharge generated power to the vehicle electrical system, can be varied to meet predetermined requirements of said electric vehicle.

3. The Ecocharge system of 2 wherein:
   a. Said drive shaft mounted EcoCharge system can be supplemented with a front axle mounted EcoCharge system and the power outputs of said drive shaft mounted EcoCharge and said front axle mounted EcoCharge are combined before interfacing to the electrical system of the electric vehicle;
   b. Said drive shaft mounted EcoCharge system can be supplemented with a rear axle mounted EcoCharge system and the power outputs of said drive shaft mounted EcoCharge and said rear axle mounted EcoCharge are combined before interfacing to the electrical system of the electric vehicle;
   c. Said drive shaft mounted EcoCharge system can be supplemented with said front axle and said rear axle mounted EcoCharge systems and the power outputs of said drive shaft mounted EcoCharge and said front axle mounted EcoCharge and said rear axle mounted EcoCharge systems are combined before interfacing to the electrical system of the electric vehicle.

* * * * *